(12) United States Patent
Charleux et al.

(10) Patent No.: US 8,598,289 B2
(45) Date of Patent: Dec. 3, 2013

(54) AMPHIPHILIC BLOCK COPOLYMER AND METHOD FOR PREPARING SAME

(75) Inventors: Bernadette Charleux, Lyons (FR); Jutta Rieger, Paris (FR); François Stoffelbach, Villejuif (FR)

(73) Assignees: Universite Pierre et Marie Curie, Paris (FR); Centre National de la Recherche, Paris (FR); Universite de Liege (Interface Entreprise Universite), Paris (FR)

( * ) Notice: Subject to any disclaimer, the term of this patent is extended or adjusted under 35 U.S.C. 154(b) by 27 days.

(21) Appl. No.: 12/989,978

(22) PCT Filed: May 11, 2009

(86) PCT No.: PCT/FR2009/050850
§ 371 (c)(1),
(2), (4) Date: May 11, 2011

(87) PCT Pub. No.: WO2009/147338
PCT Pub. Date: Dec. 10, 2009

(65) Prior Publication Data
US 2011/0207881 A1 Aug. 25, 2011

(30) Foreign Application Priority Data

May 14, 2008 (FR) ...................................... 08 02611

(51) Int. Cl.
*C08F 293/00* (2006.01)
*C08F 2/22* (2006.01)
*C08L 53/00* (2006.01)

(52) U.S. Cl.
USPC .......................................... 526/222; 524/817

(58) Field of Classification Search
USPC ........................................... 524/817; 526/222
See application file for complete search history.

(56) References Cited

U.S. PATENT DOCUMENTS

| | | | |
|---|---|---|---|
| 2004/0106732 A1* | 6/2004 | Tsuji et al. | 525/94 |
| 2005/0038280 A1* | 2/2005 | Lai et al. | 558/235 |
| 2005/0165476 A1 | 7/2005 | Furst et al. | |
| 2006/0223936 A1* | 10/2006 | Such et al. | 524/555 |
| 2007/0054816 A1 | 3/2007 | Berthier et al. | |
| 2010/0069577 A1 | 3/2010 | Couvreur et al. | |

FOREIGN PATENT DOCUMENTS

| | | |
|---|---|---|
| EP | 1801137 | 6/2007 |
| FR | 2910475 | 6/2008 |

* cited by examiner

*Primary Examiner* — Kelechi Egwim
(74) *Attorney, Agent, or Firm* — Sofer & Haroun, LLP (57) ABSTRACT

The invention relates to an amphiphilic block copolymer, to the preparation thereof, and to the use thereof in the form of a self-stabilizing latex. The copolymer has the formula $R^5O$—$[$—$CH_2CH_2$—$O$—$]_n$—$C(=O)$—$CR^3R^4$—$[CH_2CR^6R^7]_m$—$S$—$C(=S)$—$S$—$R^1$ where: $R^1$ is a straight or branched alkyl group, an alkenyl group having one or more —C=C— bonds, or an alkynyl group having one or more —C≡C— bonds, said groups including 8 to 18 carbon atoms; $20 \leq n \leq 100$; $R^3$ and $R^4$ each are independently H, an alkyl group with 1 to 4 carbon atoms, or a nitrile group, at least one of $R^3$ and $R^4$ being different than H; $R^6$ is a phenyl group or an alkoxycarbonyl group in which the alkoxy group includes 1 to 8 carbon atoms; $R^7$ is a hydrogen atom or a methyl radical; and $20 \leq m \leq 1000$. The preparation method comprises: preparing an aqueous solution of a compound $R^1$—$S$—$C(=S)$—$S$—$CR^3R^4$—$C(=O)$—$OR^2$ in which $R^2$ is $R^5$—$[$—$O$—$CH_2CH_2$—$]_n$—, $R^5$ being a hydrophilic group and $20 \leq n \leq 100$; adding to said solution one or more hydrophobic monomers of the formula (II) $R^6$—$CR^7$=$CH_2$ and a free radical polymerization initiator; and heating said aqueous solution to a temperature of 60-90° C.

3 Claims, 5 Drawing Sheets

AMPHIPHILIC BLOCK COPOLYMER AND METHOD FOR PREPARING SAME

RELATED APPLICATIONS

This application is a National Phase application of PCT/FR2009/050850, filed on May 11, 2009, which in turn claims the benefit of priority from French Patent Application No. 08 02611; filed on May 14, 2008, the entirety of which are incorporated herein by reference

BACKGROUND

1. Field of the Invention

The present invention relates to a method for preparing an amphiphilic block copolymer in an aqueous medium and in an emulsion with no free surfactant.

2. Description of Related Art

Amphiphilic copolymers are useful in many technical fields, in particular in the paints, varnishes and coatings field. Aqueous compositions, with no organic solvent, are particularly desired, firstly owing to the fact that the water used as solvent is less expensive than organic solvents, and, secondly, owing to problems of toxicity and pollution inherent in most organic solvents.

It is known practice to prepare an amphiphilic copolymer by polymerization with the aid of a reversible addition-fragmentation chain transfer (RAFT) agent, in particular in solution in an organic solvent. However, the use of organic solvents no longer meets current non-toxicity and non-pollution criteria.

The preparation, in water, of a (co)polymer using a RAFT agent can be carried out by emulsion polymerization, but it is then necessary to add a surfactant. However, since the (co)polymer obtained is generally introduced into the various paint, varnish or coating compositions directly in the form in which it is obtained, without purification, said compositions contain the surfactant free, which can then migrate when the compositions are deposited on a substrate.

Polymerization of hydrophobic monomers in the presence of a RAFT agent can be carried out without solvent ("bulk" polymerization), but the reaction medium is then very viscous, to the detriment of the speed of polymerization and of the homogeneity of the composition of the (co)polymers obtained.

A method for preparing an amphiphilic copolymer, in water, in the presence of a macro-RAFT agent is described by Ferguson et al., [Macromolecules, 2005, 28(6), 2191-2204]. The macro-RAFT agent is obtained by reacting a RAFT agent in solution with a hydrophilic monomer (acrylic acid), in the presence of a free-radical polymerization initiator and NaOH, in an oxygen-free atmosphere, with stirring at 60° C. for 2 hours. The RAFT agent is a 2-{[(alkylsulfanyl)carbonothioyl]sulfanyl}propanoic acid, in which the alkyl group is a butyl or dodecyl group. When the alkyl group is a butyl, the reaction can be carried out in water. When the alkyl group is a dodecyl, the solubility of the RAFT agent is too low and the reaction must be carried out in an organic solvent. The block copolymer is obtained by means of a method consisting in preparing an aqueous solution containing the macro-RAFT agent, a free-radical polymerization initiator and NaOH, at 60° C., and then adding, in successive fractions, the hydrophobic monomer (n-butyl acrylate, ethyl acrylate or styrene) intended to form the hydrophobic block. The monomer is added over more than 5 hours, so as to keep the monomer concentration in the reaction medium at a value below the saturation concentration. The addition of the hydrophobic monomer in fractions complicates the method and extends the duration of the process.

A method for polymerizing monomers in water in the presence of a macro-RAFT agent is described by A. Martins dos Santos et al. [Macromol. Rapid Comm., 2007, 28, 1325-1332]. The macro-RAFT agent is of the "dithiobenzoate" type, and it is obtained by reacting a poly(ethylene oxide) having an amino end group with succinimido-4-[(phenyl-1-thioxo)thio]-4-cyanopentanoate. An amphiphilic block copolymer is prepared by means of a method during which the macro-RAFT agent, the hydrophobic monomer and a free-radical polymerization initiator are introduced into water, the reaction medium is purged so as to remove the oxygen, and then heated at 70° C. This method does not make it possible to control chain growth: it is not possible to vary the molar mass of the polymer formed according to the monomer conversion; there is no direct relationship between the number-average molar mass and the ratio of the initial concentrations of monomer and of macro-RAFT agent; the molar mass distribution is broad and analogous to that obtained by means of a conventional emulsion polymerization method.

M. Manguian et al., [Macromol. Rapid Commun. 2006, 27, 399-404] describe the preparation of a macro-RAFT agent by reacting 4-cyanopentanoic acid 4-dithiobenzoate (CPADB) with diethylaminoethyl methacrylate (DEAEMA), and the use thereof for preparing an amphiphilic block copolymer with styrene, in water, in the presence of a free-radical polymerization initiator, without the addition of surfactant. In this method of implementation also, the chain growth cannot be controlled.

OBJECTS AND SUMMARY

The objective of the present invention is to propose a method for preparing an amphiphilic copolymer in emulsion in water, said method making it possible to control the molar mass of the copolymer obtained and to provide colloidal stability, without the addition of surfactant.

The subject of the present invention is a method for preparing an amphiphilic copolymer in emulsion in an aqueous medium, and also the copolymer obtained and the uses thereof.

The method according to the invention consists in:
preparing an aqueous solution of a compound of formula (I) below:

$$R^1-S-C(=S)-S-CR^3R^4-C(=O)-OR^2 \quad (I)$$

in which:
$R^1$ represents a linear or branched alkyl group, an alkenyl group having one or more —C=C— bonds, or an alkynyl group having one or more —C≡C— bonds, said groups having from 8 to 18 carbon atoms;
$R^2$ represents an $R^5-[-O-CH_2CH_2-]_n-$ group in which $R^5$ is a hydrophilic group and $20 \leq n \leq 150$;
$R^3$ and $R^4$ each represent, independently of one another, H, an alkyl group having from 1 to 4 carbon atoms or a nitrile group, at least one among $R^3$ and $R^4$ being other than H; said aqueous solution being free of surfactant,
successively adding to said solution one or more hydrophobic monomers of formula (II) below:

$$R^6-CR^7=CH_2 \quad (II)$$

in which:
$R^6$ represents a phenyl group or an alkoxycarbonyl group in which the alkoxy group has from 1 to 8 carbon atoms and optionally bears one or more functional groups, and $R^7$ represents a hydrogen atom or a methyl radical,
then a free-radical polymerization initiator; and then
in bringing said aqueous solution to a temperature of 5-95° C. for the polymerization of the hydrophobic monomer.

The choice of the particular temperature in the range 5-95° C. and the duration of the hold at this temperature depends on the particular monomer used. This choice is within the scope of those skilled in the art.

The hydrophilic group $R^5$ of the compound of formula (I) can be H or a —$(CH_2)_p$—$CH_2$—$R^8$ group in which p is 0 or 1, and $R^8$ represents H or a group chosen from —COOM, —$SO_3M$, —$OSO_3M$, —$N(CH_3)_2$ and —$N(CH_3)_3{}^+X^-$, M being H or an alkali metal, X being Cl, Br or I.

The compound of formula (I) $R^1$—S—C(=S)—S—$CR^3R^4$—C(=O)—$OR^2$ is the macro-RAFT agent used in the method of the invention. It is obtained by reacting, in solution, a 2-{[(alkylsulfanyl)carbonothioyl]sulfanyl}-2-methylpropanoic acid, in which the alkyl group has from 8 to 18 carbon atoms, with an ethylene oxide oligomer as hydrophilic segment, in an organic solvent. By way of example of 2-{[(alkylsulfanyl)carbonothioyl]sulfanyl}-2-methylpropanoic acid, mention may be made of 2-{[(dodecylsulfanyl)carbonothioyl]sulfanyl}-2-methylpropanoic acid.

The reaction is preferably carried out in a deoxygenated medium.

The choice of the hydrophobic monomer/macro-RAFT agent ratio makes it possible to adjust the length of the hydrophobic segment of the block copolymer. Said ratio, where the amounts are expressed as number of moles, is preferably between 20 and 1000, and more particularly between 20 and 500.

The method of the invention makes it possible to obtain, without the addition of surfactant, an amphiphilic copolymer which comprises a polyether hydrophilic block, and a hydrophobic block constituted of recurring —$CH_2CR^6R^7$— units. Said copolymer can be represented by general formula (III) below:

in which $R^1$, $R^3$, $R^4$, $R^5$, $R^6$ and $R^7$ and n have the meaning given above, and M is from 20 to 1000.

The preparation method in accordance with the present invention also has the advantage of being able to be carried out batchwise ab initio, i.e. by introducing all the compounds necessary for the (co)polymerization into a reactor (the compounds of formulae (I) and (II), the water and the free-radical polymerization initiator), and then allowing the (co)polymerization to take place in a single step without outside intervention.

As particular examples of copolymers of formula (III), mention may be made of the copolymers which correspond to the following formulae, Ph being a phenyl group:

i)

ii)

in which m1 and m2, which may be identical or different, range from 0 to 1000, with 20≤m1+m2≤1000;

iii)

iv)

in which m3 and m4, which may be identical or different, range from 0 to 1000, with 20≤m3+m4≤1000, and m3/(m3+m4)<0.9.

The copolymer is obtained in the form of a self-stabilizing latex, i.e. a colloidal suspension, in water, of particles formed by aggregation of macromolecules. The core of the particles is formed by the hydrophobic block and, optionally, a part of the hydrophilic block of the copolymer, and the surface of the particles is covered with all or only a part of the hydrophilic block of the copolymer, which provides colloidal stabilization of the particles in water.

The copolymers obtained by means of the method of the invention are particularly useful in the coatings, i.e. paints and varnishes, field and in the adhesives field.

The copolymers are also useful as an additive in various compositions, in particular as a pigment dispersant, as a stabilizer for oil/water or water/oil emulsions, or as a stabilizer in polymer blends.

DETAILED DESCRIPTION

The present invention is described in greater detail by means of the following examples, to which it is not, however, limited.

The examples were carried out in deionized water, using the following starting products:
ACPA 4,4'-azobis-4-cyanopentanoic acid (purity>98%, Fluka);
DCC N,N'-dicyclohexylcarbodiimide (purity>99%, Fluka);
DMAP 4-(dimethylamino)pyridine (purity>99%, Fluka);

MPEO α-methoxy-ω-hydroxy-poly(ethylene oxide) ($M_n$=2000 g·mol$^{-1}$, Fluka), dried by azeotropic distillation with dry toluene;

TTCA 2-{[(dodecylsulfanyl)carbonothioyl]sulfanyl}-2-methylpropanoic acid; prepared according to Lai, J. T., Filla, D., Shea, R. *Macromolecules* 2002, 35, 6754-6756;

DTBA 4-cyanopentanoic acid 4-dithiobenzoate, prepared according to Mitsukami, Y.; Donovan, M. S.; Lowe, A. B.; McCormick, C. L. *Macromolecules* 2001, 34, 2248-2256;

ST styrene (purity>99%, Fluka), distilled under vacuum;

nBA n-butyl acrylate (purity>99%, Aldrich) distilled under vacuum;

MMA methyl methacrylate (purity>99%, Aldrich) distilled under vacuum.

The products obtained were characterized by the following methods.

The degree of conversion of the monomer was determined by gravimetric analysis.

The molar mass and the polydispersity index of the (co) polymers were determined by size exclusion chromatography (SEC). The latter was carried out at 40° C. using two columns (PSS SDV linear MU, 5 µm). Tetrahydrofuran (THF) was used as eluent, with a flow rate of 1 mL·min$^{-1}$. The detection was carried out using an LDC Analytical refractoMonitor IV differential refractive index detector. The average molar masses were calculated from a calibration curve based on polystyrene standards sold by Polymer Standards Service.

The average particle diameter ($D_z$) and the polydispersity of the diluted aqueous dispersions were measured by dynamic light scattering (DLS) at 25° C., using the Zetasizer Nano S90 instrument from Malvern (90° angle, 5 mW He—Ne laser at 633 nm).

Example 1

Preparation of a Macro-RAFT Agent n = 47

A solution of 1.82 g of TTCA (5×10$^{-3}$ mol), 1.03 g of DCC (5×10$^{-3}$ mol) and 0.06 g of DMAP (5×10$^{-4}$ mol) in 40 mL of anhydrous THF, under a nitrogen atmosphere, was introduced into a reactor containing 5 g of dry MPEO (2.5×10$^{-3}$ mol). The reaction medium was kept at room temperature with stirring for 120 h, so as to obtain the following esterification reaction:

TTCA

-continued

PEO-TTC n = 47

The polymer formed by esterification was recovered by precipitating the reaction medium from diethyl ether under cold conditions. After filtration, the product obtained was dried under vacuum at 40° C., and then stored at 5-8° C. The macro-RAFT agent, obtained with a yield of 90%, has a number-average molar mass $M_n$ of 2420 g/mol. Its end functional group —S—C(=S)—S—C$_{12}$H$_{25}$ content is greater than 95%.

Figure 1:
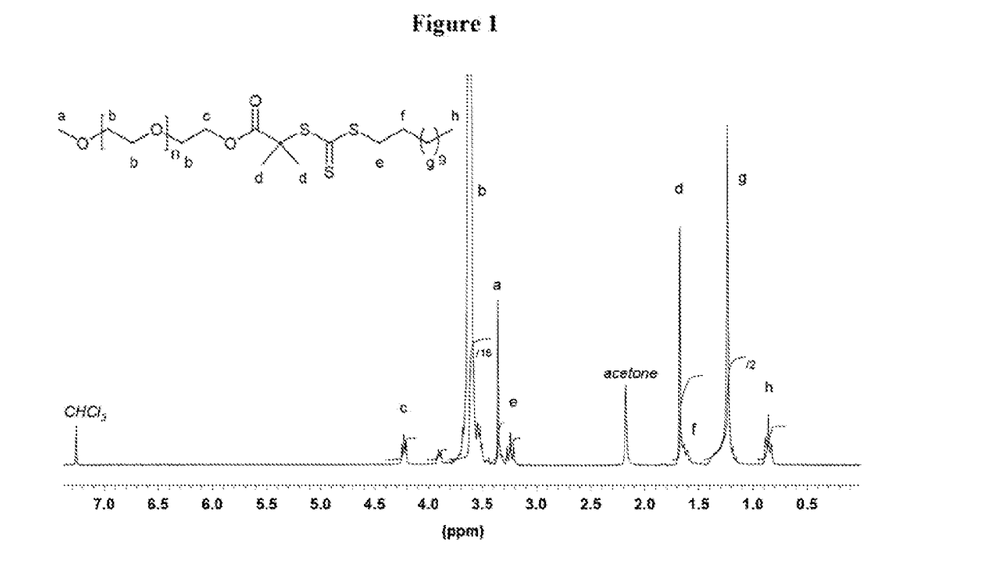
FIG. 1 is a spectrum identifying chemical shifts in example 1, in accordance with one embodiment.

The purity of the macro-RAFT agent was determined by $^1$H-NMR spectrometry using a Brücker spectrometer at 500 MHz, in CDCl$_3$ at ambient temperature. The corresponding spectrum is represented in appended FIG. 1, in which the following chemical shifts can be identified:

0.86 ppm (t, 3H, —CH$_2$CH$_3$ of the C$_{12}$H$_{25}$ group),
1.23 ppm (m, 18H, —CH$_2$(CH$_2$)$_9$CH$_3$ of the C$_{12}$H$_{25}$ group),
1.67 ppm (s, 6H, —C(CH$_3$)$_2$—SC(S)S—), 3.24 (t, 2H, —SC(S)CH$_2$CH$_2$— of the C$_{12}$H$_{25}$ group),
3.36 ppm (s, 3H, CH$_3$OCH$_2$— of the PEO group),
3.6 ppm (M, CH$_3$O—(CH$_2$CH$_2$O)$_{n-1}$—CH$_2$CH$_2$—OC(O)C(CH$_3$)$_2$— of the PEO group),
4.23 ppm (t, 2H, —CH$_2$CH$_2$—OC(O)C(CH$_3$)$_2$— of the PEO group).

Example 2

Preparation of a PEO-Polystyrene Block Copolymer 0.1670 g (0.069 mmol) of PEO-TTC obtained according to example 1 was dissolved in 7.63 g of deionized water. Next, 1.04 g (10.0 mmol) of styrene was added in a sealed 25 mL flask. In this reaction medium, the styrene represents 11% by weight relative to the total weight of the medium, and the initial concentration of PEO-TTC is 7.5 mmol·L$^{-1}$.

An aqueous solution containing 10 mg·mL$^{-1}$ of ACPA was prepared and neutralized with NaHCO$_3$ (3.5 molar equivalents relative to ACPA). 0.48 mL of this solution (i.e. 0.017 mmol of ACPA) was added to the reaction mixture contained in said sealed flask, the resulting mixture was deoxygenated by sparging with nitrogen for 30 min at 3° C., and then the flask was immersed in a thermostated oil bath at 80° C. The reaction conditions are summarized in table 1, in which:

[ACPA]$_0$ denotes the initial concentration of ACPA, in mmol·L$^{-1}$ of reaction medium;
t denotes the polymerization time, in hours;
C denotes the degree of conversion of the hydrophobic monomer, expressed as %;
[ST]$_0$/[RAFT]$_0$ denotes the initial ratio of monomer to the RAFT agent, in number of moles;
$M_{n, th}$ denotes the theoretical number-average molar mass at the experimental degree of conversion indicated;
$M_{n, exp}$ denotes the number-average molar mass, calculated from the analysis of the polymer by SEC;
$M_w/M_n$ represents the ratio of the weight-average molar mass to the number-average molar mass;

$D_z$, expressed in nm, denotes the average particle diameter. The dispersity index is indicated between parentheses. A low index indicates a narrow particle size distribution;

$N_p$ denotes the number of particles per gram of latex calculated from the gravimetric analysis, by the following equation:

$$N_p = \frac{6 \cdot \tau}{\pi \cdot D_z^3 \cdot d_p},$$

in which $\tau$ is the mass of polymer per gram of latex $[g \cdot g^{-1}_{latex}]$ and $d_p$ is the density of the polymer at 25° C., namely 1.05 $g \cdot cm^{-3}$ for polystyrene and 1.055 $g \cdot cm^{-3}$ for PnBuA.

Samples were taken at regular intervals in order to monitor, by gravimetric analysis, the degree of conversion of the monomer, and also the change in the average particle diameter and the molar mass according to the degree of conversion.

Figure 2:
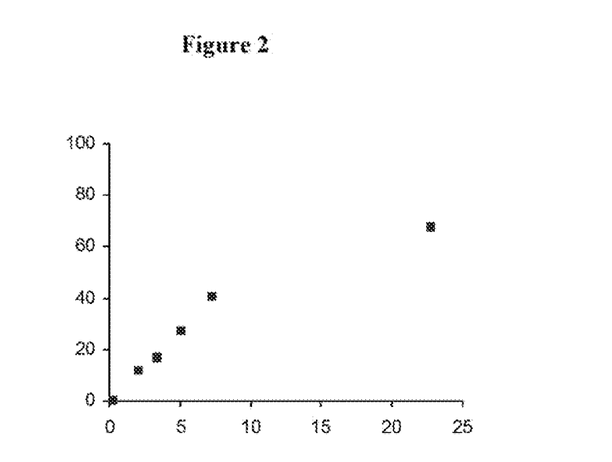
FIG. 2 represents the degree of conversion of the monomer (as %) in example 2, as a function of time (in hours), in accordance with one embodiment.

Appended FIG. 2 represents the degree of conversion of the monomer (as %), as a function of time (in hours).

Figure 3:
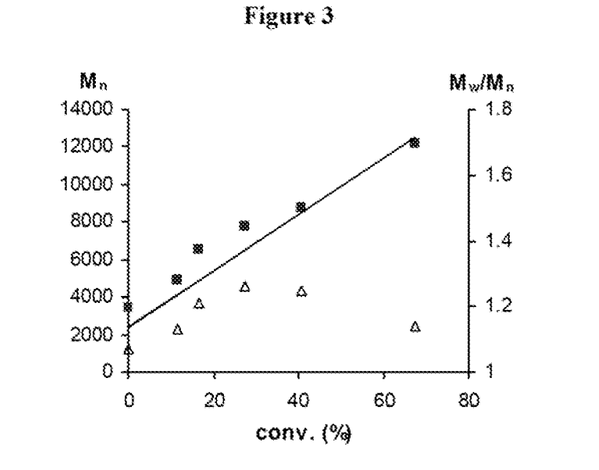
FIG. 3 represents the number-average molar mass $M_n$ (represented by the squares) and the $M_w/M_n$ polydispersity index (represented by the triangles; $M_n$ is the number-average molar mass; $M_w$ is the weight-average molar mass; the two values are calculated from the analysis of the polymers by SEC) from example 2, in accordance with one embodiment.

Appended FIG. 3 represents, as a function of the degree of conversion given along the X-axis, the number-average molar mass $M_n$ (represented by the squares) and the $M_w/M_n$ polydispersity index (represented by the triangles; $M_n$ is the number-average molar mass; $M_w$ is the weight-average molar mass; the two values are calculated from the analysis of the polymers by SEC). The straight line represents the theoretical average molecular mass as a function of the degree of conversion.

Figure 4:
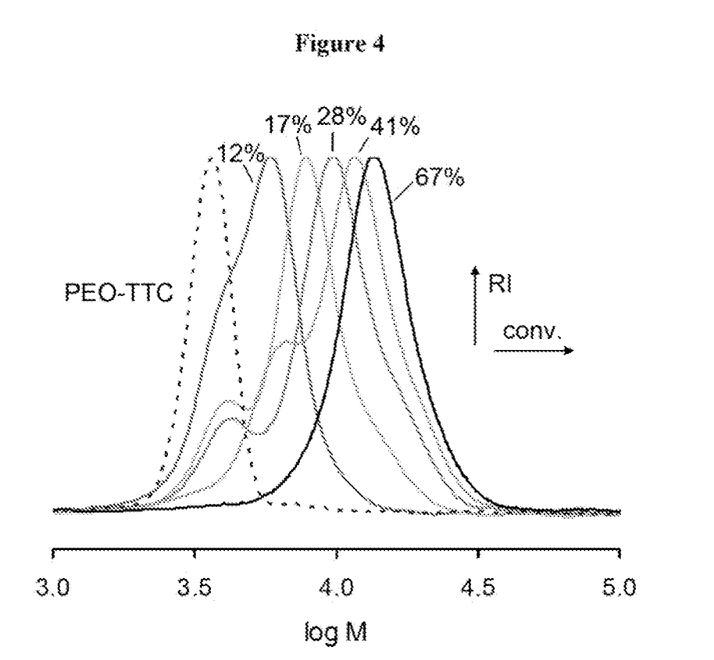
FIG. 4 represents the change of the size exclusion chromatograms as a function of the degree of conversion in example 2, in accordance with one embodiment.

Appended FIG. 4 represents the change of the size exclusion chromatograms as a function of the degree of conversion.

These figures show that:
i) the styrene polymerization is controlled in the sense that a linear variation in the number-average molar mass $M_n$ is observed with the monomer conversion, and low polydispersity indices (much less than 1.5);
ii) all of the PEO-TTC macro-RAFT agent has reacted since it is observed that the values of $M_n$ agree very well with the theoretical straight line, i.e. with the theoretical value of $M_n$ calculated at a given conversion by the ratio of the mass of polymer formed to the number of moles of macro-RAFT agent introduced.

By way of comparison, the procedure of example 2 was reproduced, replacing the macro-RAFT agent of example 1 with PEO-DTB which corresponds to the following formula:

n = 47

The operating conditions are given in table 1. It is clearly apparent that, for an equivalent reaction time (about twenty hours), the degree of conversion of the hydrophobic monomer is only 26% if the PEO-DTB is used, whereas it is 67% if the macro-RAFT agent of example 1 is used.

TABLE 1

| RAFT | $[ACPA]_0$ | $[ST]_0/[RAFT]_0$ | t | C | $M_{n,th}$ | $M_{n,exp}$ | $M_w/M_n$ | $D_z$ (dispersity) | $N_p$ |
|---|---|---|---|---|---|---|---|---|---|
| PEO-TTC | 1.6 | 145 | 22.7 | 67 | 12.5 | 12.2 | 1.16 | 260 (0.16) | $9.7 \times 10^{12}$ |
| PEO-DTB | 2.0 | 143 | 23.3 | 26 | | | | | |

Example 3

Preparation of a PEO-b-poly(n-butyl acrylate) Block Copolymer

Sample A2

0.1670 g (0.069 mmol) of PEO-TTC obtained according to example 1 was dissolved in 7.63 g of deionized water. Next, 1.28 g (10 mmol) of n-butyl acrylate were added in a 25 mL sealed flask. In this reaction medium, the styrene represents 13% by weight and the initial concentration of PEO-TTC is 7.1 $mmol \cdot L^{-1}$.

An aqueous solution containing 10 $mg \cdot mL^{-1}$ of ACPA was prepared, and was neutralized with $NaHCO_3$ (3.5 molar equivalents relative to ACPA). 0.48 mL of this solution (i.e. 0.017 mmol of ACPA) was added to the reaction mixture contained in said sealed flask, the resulting mixture was deoxygenized by sparging with nitrogen for 30 min at 3° C., and then the flask was immersed in a thermostated oil bath at 70° C.

Samples A1, A3 and A4

The procedure for sample A2 was reproduced, with different amounts of hydrophobic monomer. In samples A1, A2 and A3, the concentration of macro-RAFT agent was kept virtually constant and the concentration of hydrophobic monomer was modified. When the monomer/macro-RAFT agent ratio increases, the length of the hydrophobic segment increases, as envisioned, as does the diameter of the latex particles (from 89 nm to 510 nm), and the number of particles substantially decreases. In sample A4, the concentration of PEO-TTC macro-RAFT agent was increased compared with experiment A3.

The procedure under the conditions of sample A2 was also reproduced, with the PEO-TTC macro-RAFT agent being replaced with the PEO-DTB macro-RAFT agent used by way of comparison in example 2. This comparative test is denoted X2.

The conditions of the various tests are given in table 2, in which:
the nBA row indicates the percentage by weight represented by the monomer in the reaction mixture;
the $[ACPA]_0$ row gives the initial concentration of ACPA in the initial reaction medium, in $mmol \cdot L^{-1}$;
the t row gives the conversion time, in hours;
the C row gives the % degree of conversion of the nBA monomer;
the $[nBA]_0/[RAFT]_0$ row denotes the initial molar ratio of nBa monomer to the macro-RAFT agent;

the $M_{n, th}$ row gives the theoretical number-average molar mass, at the experimental degree of conversion indicated;

the $M_{n, exp}$ row gives the number-average molar mass calculated from the analysis of the polymer by SEC;

the $M_w/M_n$ row gives the ratio of the weight-average molar mass to the number-average molar mass;

the $D_z$ row, expressed in nm, gives the average particle diameter. The dispersity index is indicated between parentheses. A low index indicates a narrow particle size distribution;

the $N_p$ row gives the number of particles per gram of latex, calculated from the gravimetric analysis, by the equation given for example 2.

Samples were taken at regular intervals in order to follow, by gravimetric analysis, the degree of conversion of the monomer and also the change in average particle diameter and the molar mass as a function of the degree of conversion.

Figure 5:
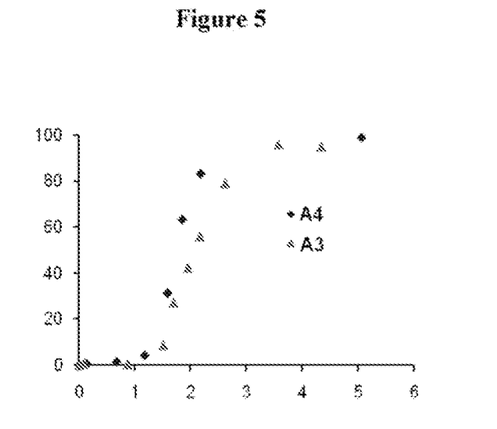
FIG. 5 represents the degree of conversion of the monomer (as %), as a function of time (in hours) from example 2, in accordance with one embodiment.

Appended FIG. 5 represents the degree of conversion of the monomer (as 5%), as a function of time (in hours). The diamonds correspond to sample A4 and the triangles to sample A3.

Figure 6:
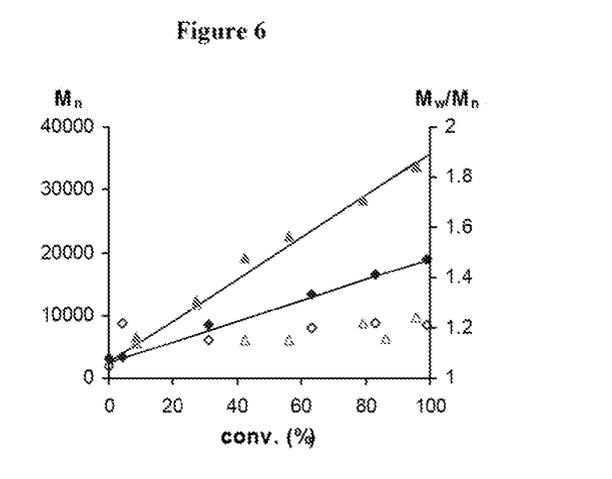
FIG. 6 represents the number-average molar mass $M_n$ (represented by the solid diamonds and triangles) and the $M_w/M_n$ polydispersity index (represented by the open diamonds and triangles) from example 3, in accordance with one embodiment.

Appended FIG. 6 represents, as a function of the degree of conversion given along the X-axis, the number-average molar mass $M_n$ (represented by the solid diamonds and triangles) and the $M_w/M_n$ polydispersity index (represented by the open diamonds and triangles). The straight line represents the theoretical average molar mass as a function of the degree of conversion.

Figure 7:
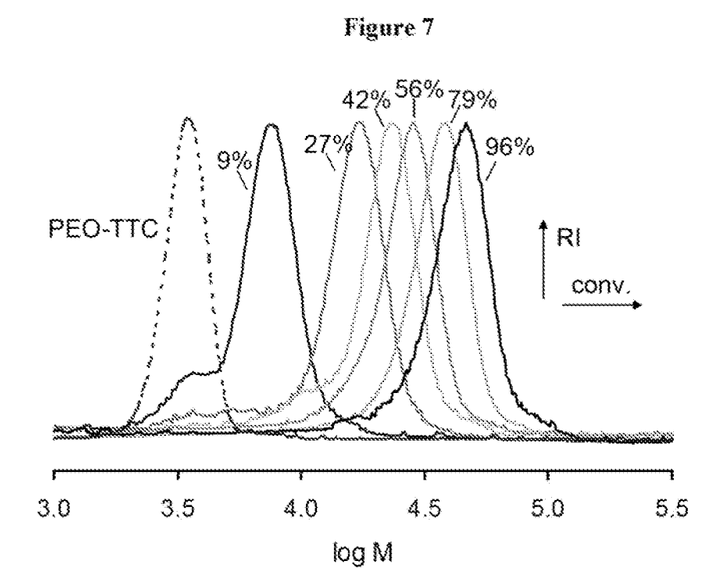
FIG. 7 represents the change of the size exclusion chromatograms as a function of the degree of conversion in example 3, in accordance with one embodiment.

Appended FIG. 7 represents the change of the size exclusion chromatograms as a function of the degree of conversion.

These results show, firstly, that the polymerization of the n-butyl acrylate is particularly rapid and virtually complete and, secondly, that it was possible to reach 23% by weight of polymer (sample A4) or 24% by weight of polymer (sample A3) without destabilization of the latex (sample A4) under batchwise conditions, i.e. by adding all the reactants to the reactor at the beginning of the reaction. They also show the clear superiority of the macro-RAFT agent used in the present invention, compared with the PEO-DTB macro-RAFT agent.

TABLE 2

| | Sample | | | | |
|---|---|---|---|---|---|
| | A1 | A2 | A3 | A4 | X2 |
| nBA | 9 | 13 | 24 | 23 | 14 |
| [PEO-TTC]$_0$ | 8.1 | 7.1 | 7.0 | 14.2 | 7.2 |
| [ACPA]$_0$ | 1.6 | 1.8 | 1.4 | 3.0 | 1.8 |
| [monomer]$_0$/[PEO-TTC]$_0$ | 90 | 145 | 262 | 130 | 149 |
| t | 20.0 | 7.0 | 3.7 | 5.1 | 30.3 |
| C | 66 | 96 | 96 | 99 | 4 |
| $M_{n,th}$ | 10.0 | 20.3 | 34.6 | 18.8 | |
| $M_{n, exp}$ | 9.9 | 22.2 | 33.8 | 18.9 | |
| $M_w/M_n$ | 1.41 | 1.26 | 1.24 | 1.21 | |
| $D_z$ (nm) (dispersity) | 89 (0.05) | 200 (0.04) | 510 (0.09) | 220 (0.02) | |
| $N_p$ | $2.1 \times 10^{14}$ | $3.3 \times 10^{13}$ | $3.4 \times 10^{12}$ | $4.5 \times 10^{13}$ | |

Example 4

Preparation of a PEO-b-poly(methyl methacrylate)-co-poly(n-butyl acrylate) Block Copolymer 0.167 g ($M_n$=2420 g·mol$^{-1}$, i.e. 6.9×10$^{-5}$ mol) of PEO-TTC macro-RAFT agent obtained according to example 1 was dissolved in 3.666 g of deionized water in a 25 mL sealed flask. An aqueous solution containing 8 mg·mL$^{-1}$ of ACPA was prepared and was neutralized with NaHCO$_3$ (3.5 molar equivalents relative to ACPA). 0.5 mL (4.0 mg, 1.4×10$^{-5}$ mol) of this solution was added to the PEO-TTC solution. 0.575 g (4.5×10$^{-3}$ mol) of nBA and 0.459 g of MMA (4.6×10$^{-3}$ mol) were then added to the mixture contained in said sealed flask. The reaction mixture was deoxygenated by sparging with nitrogen for 30 min at 3° C., and then the flask was immersed in a thermostated oil bath at 70° C.

Samples were taken at regular intervals in order to monitor, by gravimetric analysis, the degree of conversion of the monomer and also the change in the average particle diameter and the molar mass as a function of the degree of conversion.

After polymerization for 5.4 h, the overall monomer conversion comes to 92%. A stable latex composed of particles of 125 nm (dispersity factor=0.04) is obtained.

Figure 8:
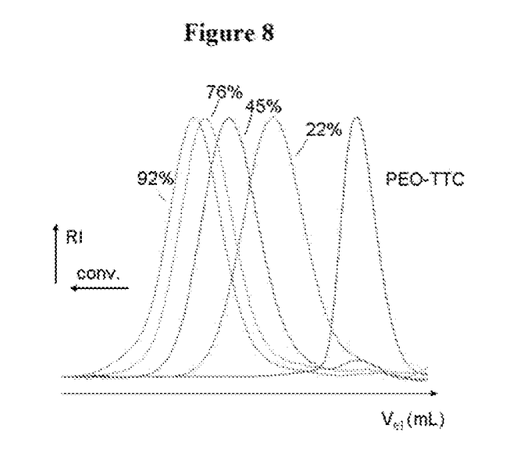
FIG. 8 shows the change of the size exclusion chromatograms with the conversion: they shift with the conversion, and complete disappearance of the initial peak of the macro-RAFT agent (PEO-TTC) is observed, indicating complete consumption of the latter in example 4 in accordance with one embodiment.

Appended FIG. 8 shows the change of the size exclusion chromatograms with the conversion: they shift with the conversion, and complete disappearance of the initial peak of the macro-RAFT agent (PEO-TTC) is observed, indicating complete consumption of the latter.

Figure 9:
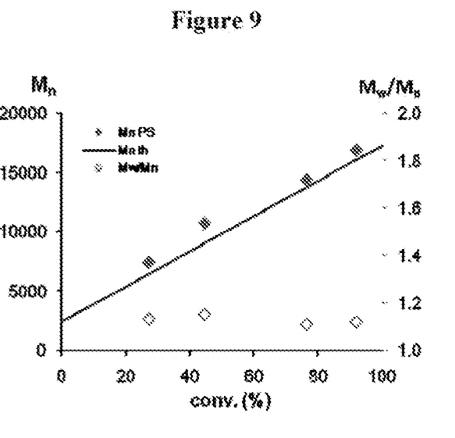
FIG. 9 represents, as a function of the degree of conversion given along the X-axis, the number-average molar mass $M_n$ (represented by the solid diamonds) and the $M_w/M_n$ polydispersity index (represented by the open diamonds) from example 4 in accordance with one embodiment.

Appended FIG. 9 represents, as a function of the degree of conversion given along the X-axis, the number-average molar mass $M_n$ (represented by the solid diamonds) and the $M_w/M_n$ polydispersity index (represented by the open diamonds). The straight line represents the theoretical average molar mass as a function of the degree of conversion. A linear variation of $M_n$, with the conversion, and very close agreement with the expected masses are observed. These results show that the copolymerization of the n-butyl acrylate and methyl methacrylate can be controlled in an aqueous emulsion under batch conditions ab initio in the presence of the macro-RAFT agent described in example 1. Self-stabilizing acrylic latices can be obtained by means of this simple method not requiring the addition of conventional surfactant.

The invention claimed is:

1. A method for preparing an amphiphilic copolymer, in emulsion in an aqueous medium, said method consisting of:
    preparing an aqueous solution of a compound of formula (I) below:

$$R^1—S—C(=S)—S—CR^3R^4—C(=O)—OR^2 \quad (I)$$

in which:
    $R^1$ represents a linear or branched alkyl group, an alkenyl group having one or more —C=C— bonds, or an alkynyl group having one or more —C≡C— bonds, said groups having from 8 to 18 carbon atoms;
    $R^2$ represents an $R^5$—[—CH$_2$CH$_2$—]$_n$— group in which $R^5$ is a hydrophilic group and 20≤n≤150;
    $R^3$ and $R^4$ each represent, independently of one another, H, an alkyl group having from 1 to 4 carbon atoms or a nitrile group, at least one among $R^3$ and $R^4$ being other than H; said aqueous solution being free of free surfactant,
    successively adding to said solution one or more hydrophobic monomers of formula (II) below:

$$R^6—CR^7=CH_2 \quad (II)$$

in which:
    $R^6$ represents a phenyl group or an alkoxycarbonyl group in which the alkoxy group has from 1 to 8 carbon atoms and optionally bearing one or more functional groups, and
    $R^7$ represents a hydrogen atom or a methyl radical,
    then a free-radical polymerization initiator; and then
    in bringing said aqueous solution to a temperature of 5-95° C.

2. The method as claimed in claim 1, wherein the hydrophilic group $R^5$ of the compound of formula (I) is H a —$(CH_2)_p$—$CH_2$—$R^8$ group in which p is 0 or 1, and $R^8$ represents H or a group chosen from —COOM, —$SO_3M$, —$OSO_3M$, —$N(CH_3)_2$ and —$N(CH_3)_3{}^+X^-$, M being H or an alkali metal, X being Cl, Br or I.

3. The method as claimed in claim 1, wherein the hydrophobic monomer/compound I molar ratio is between 20 and 1000.

* * * * *

UNITED STATES PATENT AND TRADEMARK OFFICE
CERTIFICATE OF CORRECTION

PATENT NO. : 8,598,289 B2  
APPLICATION NO. : 12/989978  
DATED : December 3, 2013  
INVENTOR(S) : Charleux et al.

Page 1 of 1

It is certified that error appears in the above-identified patent and that said Letters Patent is hereby corrected as shown below:

In the Claims

Column 10, Claim 1, Line 49: The formula "$R^5$-[-$CH_2CH_2$-]n" between the words "an" and "group" should be changed to "$R^5$-[-O-$CH_2CH_2$-]n"

Column 11, Claim 2, Line 2: The word --or-- should be inserted between the element "H" and the letter "a"

Signed and Sealed this  
Eighteenth Day of February, 2014

Michelle K. Lee  
*Deputy Director of the United States Patent and Trademark Office*